(12) United States Patent
Dittrich et al.

(10) Patent No.: US 7,345,790 B2
(45) Date of Patent: Mar. 18, 2008

(54) METHOD AND APPARATUS FOR SIMULATING 2 BIT-PER-PEL PRINTING ON A BI-LEVEL PRINTER USING INTELLIGENT DOUBLE DOTTING

(76) Inventors: Danielle K. Dittrich, 512 N. 13th St., Boise, ID (US) 83702; Larry M. Ernst, 2336 Corey St., Longmont, CO (US) 80501

( * ) Notice: Subject to any disclaimer, the term of this patent is extended or adjusted under 35 U.S.C. 154(b) by 942 days.

(21) Appl. No.: 10/248,450

(22) Filed: Jan. 21, 2003

(65) Prior Publication Data
US 2004/0141189 A1 Jul. 22, 2004

(51) Int. Cl.
*H04N 1/405* (2006.01)
(52) U.S. Cl. .................... 358/3.07; 358/3.06
(58) Field of Classification Search ............ 358/2.1, 358/1.2, 3.06–3.1, 3.13–3.14, 1.9; 382/237
See application file for complete search history.

(56) References Cited

U.S. PATENT DOCUMENTS

| | | | |
|---|---|---|---|
| 3,573,789 A | 4/1971 | Sharp et al. | |
| 5,107,349 A | 4/1992 | Ng et al. | |
| 5,270,835 A | 12/1993 | Urabe et al. | |
| 5,291,310 A | 3/1994 | Levien | |
| 5,382,967 A | 1/1995 | Curry | |
| 5,386,301 A | 1/1995 | Yuasa et al. | |
| 5,471,543 A | 11/1995 | Ng et al. | |
| 5,489,991 A | 2/1996 | McMurray | |
| 5,587,811 A | 12/1996 | Liguori | |
| 5,751,470 A | 5/1998 | Damon | |
| 5,903,713 A | 5/1999 | Daels et al. | |
| 5,920,682 A | 7/1999 | Shu et al. | |
| 5,999,646 A * | 12/1999 | Tamagaki ............... | 382/169 |
| 6,137,518 A | 10/2000 | Maeda | |

* cited by examiner

*Primary Examiner*—Thomas D. Lee
*Assistant Examiner*—Stephen Brinich

(57) ABSTRACT

An image processing method and apparatus for enhancing the quality of a printed image without degrading overall printer performance or throughput by simulating 2 bit pel printing on a bi-level printer using intelligent double dotting. The present invention allows a bi-level printer to print an 2N dpi 1 bit-per-pel image through intelligent double dotting, thus enhancing the half resolution rendered image to approach the print quality as if the image were rendered at full resolution. In one embodiment, an enhanced resolution mode which uses a bi-level printer's 1200 dpi mode to print 600 dpi, 2 bit-per-pel images, results in an image having higher resolution quality than rendering the image using traditional halftone methods at either 600 dpi or 1200 dpi. Image enhancement through higher order resolution multiplication is also disclosed.

36 Claims, 10 Drawing Sheets

METHOD AND APPARATUS FOR SIMULATING 2 BIT-PER-PEL PRINTING ON A BI-LEVEL PRINTER USING INTELLIGENT DOUBLE DOTTING

FIELD OF THE INVENTION

The present invention relates in general to document presentation, and, more particularly to, a method and apparatus for enhancing the quality of a printed image through simulating 2 bit pel printing on a bi-level printer using intelligent double dotting.

DESCRIPTION OF THE RELATED ART

In today's fast paced world, information must be shared quickly. Employers, employees and customers demand high quality documents that are affordable, and they want them fast. A critical component of meeting customer's information needs is a reliable, cost effective, flexible, multi-function printer.

Customers are no longer satisfied with simple text documents. Well received documents now include images, graphics, compressed images, text any where on a page, multiple pages of data on a single page, multiple character sets and multiple fonts, for example. Recent printers simply can't effectively handle the amount of data required to produce these kind of documents. Improving resolution of images and in general overall image quality drives research in printer technology.

The detail of a printed image can be characterized through the number of dots per inch (dpi) that were printed in constructing the image. It would be an obvious assumption, that the more dots per inch that a printer can print would translate into a better quality printed image. However, the problem is not that simple. Not all images are black and white. Many are composed of shades of grey. Providing a high quality image having numerous different shades ranging from black to white presents a challenge to the printer technologist.

When an image is presented to a printer or display device, the printer or display device receives and processes a data stream that contains the image. One type of printer is a bi-level printer. Bi-level printers are printers that can only produce two output levels, i.e., black and white. In order for an image to be printed by a bi-level printer, the image must be in a bi-level image format. The bi-level image format is defined such that each pixel (pel) is represented by a single bit of digital information, while other image presentation devices may assign eight bits (one byte) or more to represent each pixel in the image. A bi-level printer only accepts one bit per pixel. In black and white printing mode in bi-level printers, the pixel is either black (darkened) or white (undarkened). It should be noted that a pixel or pel may comprise several dots, in the dot per inch resolution scheme. However, if it is determined that the pel is to be printed, all the dots comprising the pel will be printed, likewise if it is determined that the pel is not to be printed then none of the dots comprising the pel will be printed.

Simple black and white output works well for images consisting of text only, but, as suggested above, more complex graphical images need to be expressed through various shades of grey. The use of halftoning, or multi-level thresholding, has been found to adapt printers to produce visual shades of grey, while maintaining a black and white printer's functional limitation of printing either a black pel, or no pel at all. Halftoning renders the illusion of shades of grey by using only two levels, black and white. Halftoning relies on the human eye to average over small regions to create the effect of grey regions where only black and white regions exist. This averaging effect of human vision produces a grey scale effect in an output image. Halftoning can also be characterized as the process of using two dimensional variable level thresholding to generate bi-level images.

In general, there are two methods for enhancing the resolution of an image for output. The first method of providing resolution enhancement is to provide pixel replication. Pixel replication involves calculating the size of the output image using a scaling factor. Several points in the output image are mapped from a single point in the input image. Pixel replication can be done in both dimensions, i.e., vertically and horizontally, thus increasing the physical size of the image output.

The other resolution enhancement method uses interpolation. Interpolation calculates the output value to be interpolated over the input pixel and its three immediate neighbors. Any other interpolation of adjoining neighbors, such as all eight adjoining neighbors, is also possible. This is more pleasing than pixel replication, but requires more time and space than the pixel replication method.

Bi-level printers are known to have the ability to print in at least two different resolutions or in at least two different modes. For example, a bi-level printer may print at 600 dpi and also at 1200 dpi. The print quality of images produced at 1200 dpi, using traditional screens, is not as good as the print quality of images produced at 600 dpi.

A disadvantage to the traditional resolution enhancing methods is that upon increasing the number of dots available to work with in representing an image, where there were once, for instance 600 dpi, or dots per inch, there are now available 1200 dpi, or dots per inch. When enhancing the resolution from 600 to 1200 dpi, after a one to one correspondence, dot for dot, there remains 600 dots unassigned. Determining whether to darken an unassigned dot or leave the dot white is an important component of resolution enhancing.

In some instances, while applying the two resolution enhancing methods recited above, poor quality images have been rendered. Poor image quality has been attributed to, for example, a single white (undarkened) pixel being surrounded by black (darkened) pixels, and thus being filled in by dot gain and going unnoticed by the human eye. Alternatively, a single black pixel sticking out from a cluster adds noise to the image and degrades the image quality.

Printing high resolution images is excessively time consuming. To overcome this disadvantage, images are printed at half the print engine's resolution. Printing images at half resolution can improve the overall printer performance or throughput, but the resultant printed images display lower print quality than images printed at full resolution. It can be seen that there is a need for an improved method for enhancing the quality of a printed image without degrading overall printer performance or throughput and apparatus for carrying out the same. There exists a need to, create an enhanced resolution mode that takes advantage of a bi-level printer's capabilities, print images having a high quality, high resolution image with bi-level printers set to high resolution mode, and overcome historical print quality deficiencies.

There exists a need for a device which can print high resolution images in a reasonable amount of time without degrading the printer's performance or throughput.

There is a need for a resolution enhancing method which can sharpen the resolution of output images beyond the capabilities of traditional halftoning and resolution enhancing methods.

BRIEF SUMMARY OF THE INVENTION

To overcome the limitations in the prior art described above, and to overcome other limitations that will become apparent upon reading and understanding the present specification, the present invention discloses a method and apparatus for enhancing the quality of a printed image without degrading overall printer performance or throughput by simulating 2 bit pel printing on a bi-level printer using intelligent double dotting.

The present invention solves the above-described problems by allowing a 2N bi-level printer to print an N dpi 2 bit-per-pel image through intelligent double dotting, thus enhancing the half resolution rendered image to approach the print quality of images rendered at full resolution.

A method in accordance with the principles of the present invention includes converting an image to an N dpi 8 bit-per-pel image, halftoning the N dpi 8 bit-per-pel image to an N dpi 2 bit-per-pel image and converting N dpi 2 bit pels from the N dpi 2 bit-per-pel image to Y2 YN dpi 1-bit pels.

In another embodiment of the present invention, another method is provided. The second method includes converting an image to an N dpi 8 bit-per-pel image, halftoning the N dpi 8 bit-per-pel image to an N dpi 2 bit-per-pel image and converting N dpi 2 bit pels from the N dpi 2 bit-per-pel image to 4 2N dpi 1 bit pels.

In another embodiment of the present invention, an apparatus for enhancing the resolution of an image to be printed using a bi-level printer simulating 2 bit pel printing is provided. The apparatus includes memory for storing an image for printing and an image processor, wherein the image processor converts the image to an N dpi 8 bit-per-pel image, halftones the N dpi 8 bit-per-pel image to an N dpi 2 bit-per-pel image and converts N dpi 2 bit pels from the N dpi 2 bit-per-pel image to 4 2N dpi 1-bit pels.

In another embodiment of the present invention, an article of manufacture includes a program storage medium readable by a computer. The medium tangibly embodies one or more programs of instructions executable by the computer to perform a method for simulating 2 bit pel printing on a bi-level printer, wherein the method includes converting an image to an N dpi 8 bit-per-pel image, halftoning the N dpi 8 bit-per-pel image to an N dpi 2 bit-per-pel image and converting N dpi 2 bit pels from the N dpi 2 bit-per-pel image to 4 2N dpi 1-bit pels.

In another embodiment of the present invention, a printer system is provided. The printer system includes a scanner for scanning an input image, a memory, coupled to the scanner, the memory storing a scanned image and an image processor, coupled to the memory, for processing the scanned image in the memory, wherein the image processor converts the image to an N dpi 8 bit-per-pel image, halftones the N dpi 8 bit-per-pel image to an N dpi 2 bit-per-pel image and converts N dpi 2 bit pels from the N dpi 2 bit-per-pel image to 4 2N dpi 1-bit pels.

In another embodiment of the present invention, an image enhancing system is provided. The image enhancing system includes means for scanning an input image, means for storing a scanned image coupled to the means for scanning and means for processing a stored image coupled to the means for storing, wherein the means for processing converts the stored image to an N dpi 8 bit-per-pel image, halftones the N dpi 8 bit-per-pel image to an N dpi 2 bit-per-pel image and converts N dpi 2 bit pels from the N dpi 2 bit-per-pel image to 4 2N dpi 1-bit pels in a 2N 1 bit-per-pel image.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE SEVERAL VIEWS OF THE DRAWINGS

Referring now to the drawings in which like reference numbers represent corresponding parts throughout:

FIG. 8 illustrates a block diagram demonstrating the computation of how many of the 2N 1 bit pels are to be turned on;

DETAILED DESCRIPTION OF THE INVENTION

In the following description of the exemplary embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention provides a method and apparatus for enhancing the quality of a printed image by simulating 2 bit pel printing by allowing a 2N bi-level printer to print a N dpi 2 bit-per-pel image through intelligent double dotting, thus enhancing the half resolution rendered image to approach the print quality of an image rendered at full resolution.

Figure 1:
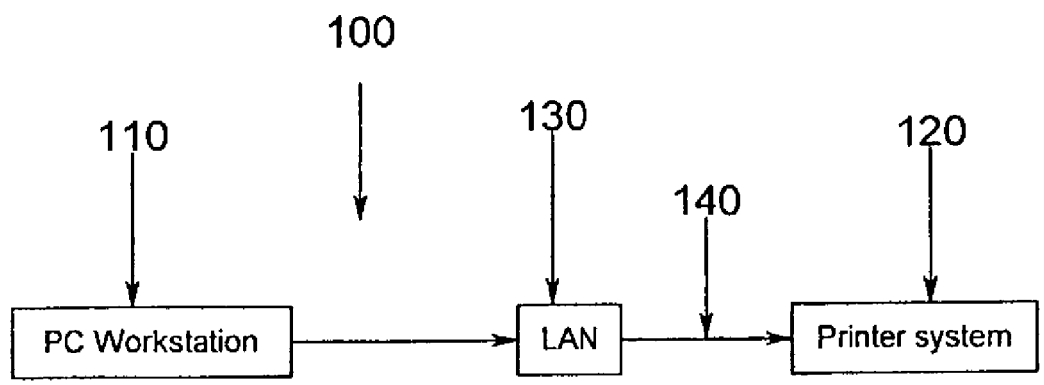
FIG. 1 illustrates a simplified block diagram of one network printing environment according to the present invention.

FIG. 1 illustrates a simplified block diagram of one network printing environment 100 according to the present invention. In FIG. 1, a personal computer workstation 110 is coupled to a printer system 120 via a local area network (LAN) 130. The personal computer workstation 110 sends print data to the printer system 120 when the personal computer workstation 110 has data to print. The printer system 120 converts the input print data stream 140 to a data stream supported by the printer system 120. For example, the printer system 120 may accept the Intelligent Printer Data Stream (IPDS), PostScript, or some other printer data stream. The printer system 120 may also be configured to perform manipulation of compressed images, such as rotation, to allow more efficient processing of the input print data stream 140. The present invention is not meant to be limited to a network printing environment 100, but is equally applicable to any printing environment.

Figure 2:
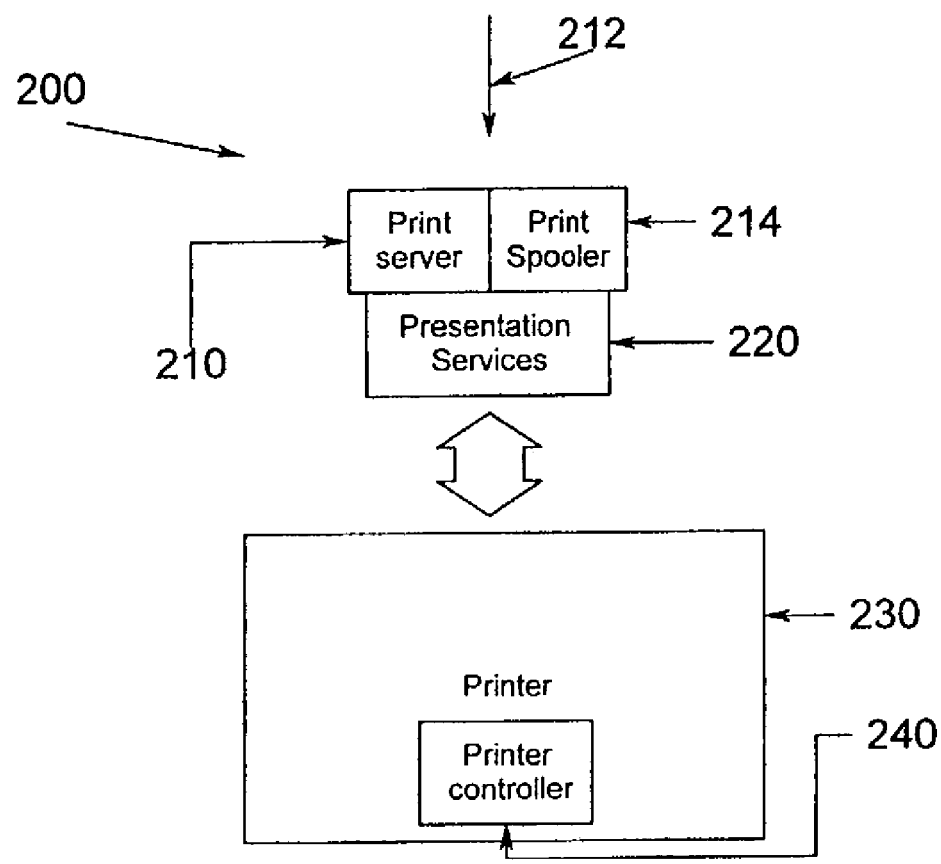
FIG. 2 illustrates a more detailed block diagram of one embodiment of a printer system according to the present invention.

FIG. 2 illustrates a more detailed block diagram of one embodiment of a printer system 200 according to the present invention. In FIG. 2, the printer system 200 includes a print server 210 for receiving the input print data stream 212, a print spooler 214 for controlling the spooling of data files and presentation services 220 for generating appropriate commands to drive an attached printer 230. The print server 210 may also include other components that are not shown for performing basic tasks, such as monitoring and configuring attached printers, and providing print job management. The printer server 210 converts the input print data stream 212 to a data stream supported by the printer 230. The print server 210 may be configured to provide image processing such as halftoning according to the present invention. Alternatively, the image processing may be performed locally to the printer 230, e.g., by the printer controller 240.

Figure 3:
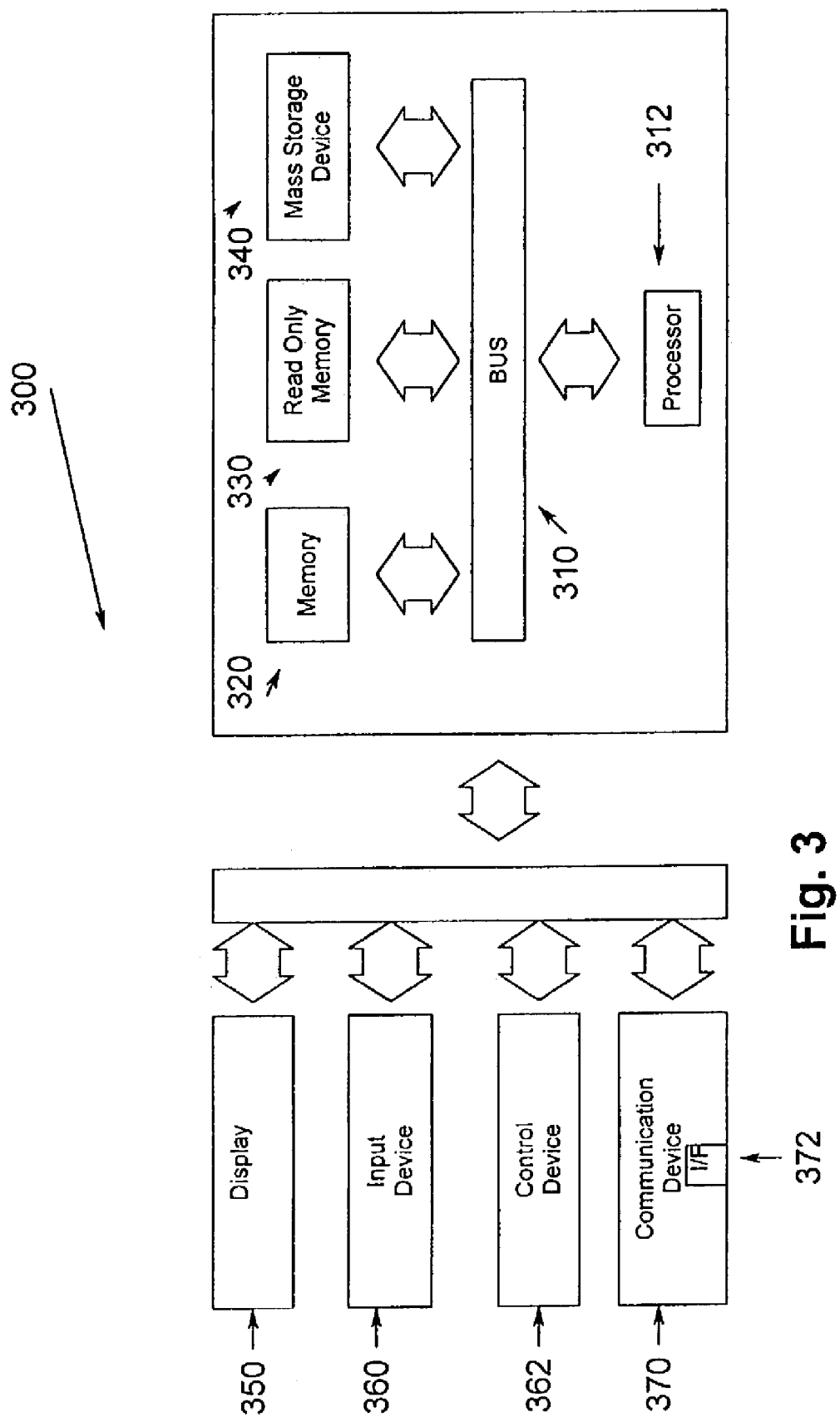
FIG. 3 illustrates one embodiment of the device in the form of a computer system in which features of the present invention may be implemented.

Having briefly described one example of a printing environment in which the present invention may be employed, one embodiment of device in the form of a computer system 300 in which features of the present invention may be implemented will now be described with reference to FIG. 3. As shown in FIG. 3, the computer system 300 may represent a workstation, host, server, print server, printer or printer controller. Computer system 300 includes a bus or other communication means 310 for communicating information and a processing means such as a processor 312 coupled with bus 310 for processing information. Computer system 300 also includes a random access memory (RAM) or other dynamic storage device 320, coupled to bus 310 for storing information and instructions to be executed by processor 312. Memory 320 also may be used for storing temporary variables or other intermediate information during execution of instructions by processor 312. Computer system 300 may also include a read only memory (ROM) and/or other static storage device 330 coupled to the bus 310 for storing static information and instructions for processor 312.

A data storage device 340 such as a magnetic disk or optical disk and its corresponding drive may also be coupled to the bus 310 for storing information and instructions. Computer system 300 can also be coupled via bus 310 to a display device 350, such as a cathode ray tube (CRT) or Liquid Crystal Display (LCD), for displaying information to an end user. Typically, an input device 360 is coupled to bus 310 for communicating information and/or command selections to processor 312. Another type of user input device 362 communicates direction information and command selections to processor 312 and for controlling cursor movement on display 350.

A communication device 370 is also coupled to bus 310. Depending upon the particular presentation environment implementation, the communication device 370 may include a modem, network interface card or other well know interface devices 372, such as those used for coupling to Ethernet, token ring, or other types of physical attachment for purposed of providing communication link to support a local or wide area network, for example. In this manner, the computer system 300 may be coupled to a number of clients and/or servers via a conventional network infrastructure.

The present invention is related to the use of computer system 300 to direct the execution of one or more software and/or firmware routines to manipulate print images as discussed herein. As computer system 300 executes the one or more routines, the processor 312 may access image data stored within memory 320, ROM 330, or another storage device to manipulate an image according to the halftone process described herein. Importantly, the present invention is not limited to having all of the routines located on the same computer system. Rather, individual objects, program elements, or portions thereof may be spread over a distributed network of computer systems. Additionally, a lesser or more equipped computer system, than the example described above, may be desirable for certain implementations. Therefore, the configuration of computer system 300 will vary from implementation to implementation depending upon numerous factors, such as price constraints, performance requirements, and/or other circumstances. For example, according to one embodiment of the present invention, an embedded printer controller may comprise only a processor and a memory for storing static or dynamically loaded instructions and/or data.

Figure 4:
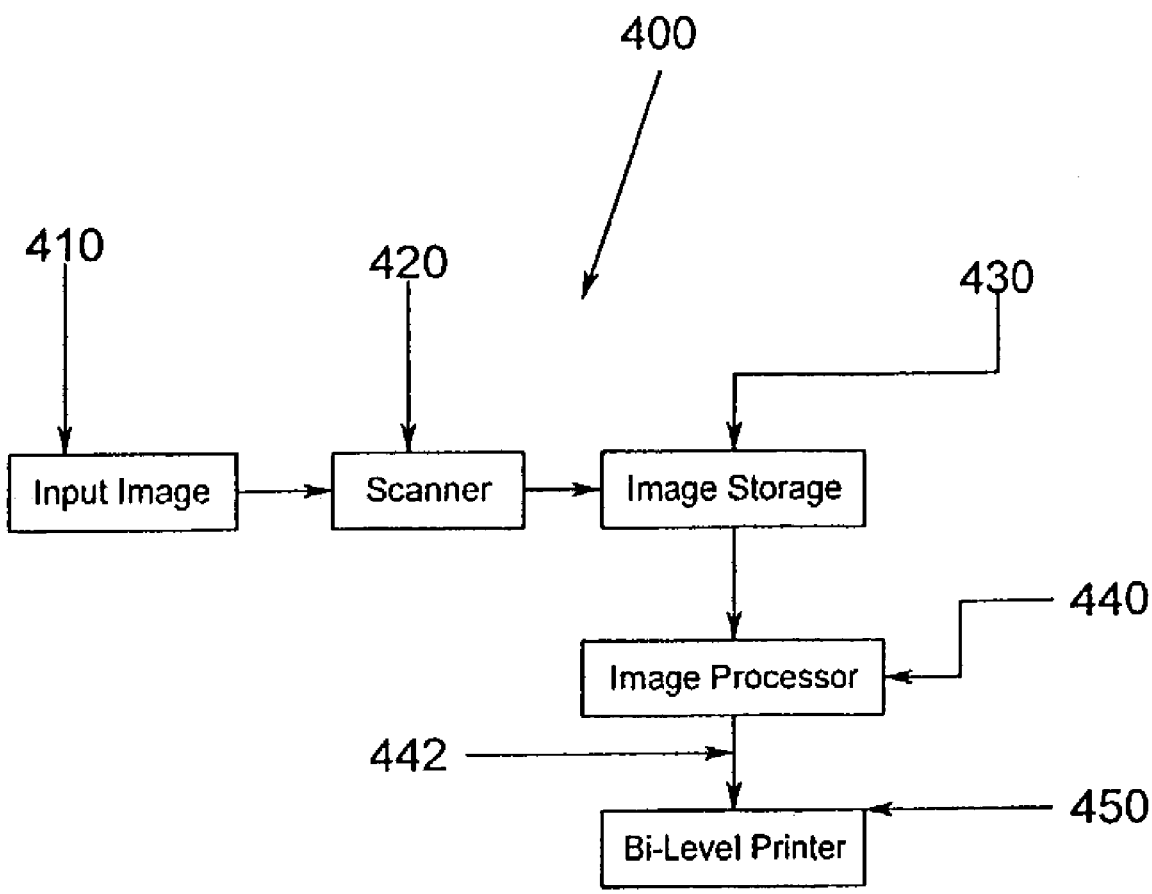
FIG. 4 illustrates a block diagram of a halftoning and converting system according to one embodiment of the present invention.

FIG. 4 illustrates a block diagram of an image processing system 400 according to one embodiment present invention. In FIG. 4, an input image 410 is scanned by a scanner 420 and stored in image storage 430. An image processor 440 processes the stored image by first digitizing and quantizing the image, converting and assigning each pel of the image to an 8 bit grey scale value, using a halftoning threshold matrix to convert each pel of the image to a two bit composite image value, increasing the resolution of the image (doubling, tripling, etc.) through intelligent double dotting (triple dotting, etc.), determining how many and which pels of the converted and halftoned image will get printed as a dot or a plurality of dots through analysis of the surrounding neighborhood adjacent pels. The output 442 of the image processor 440 is sent to a bi-level printer 450. The image processing and conversion process according to the present invention will now be explained herein below with reference to FIGS. 5-8.

Figure 5:
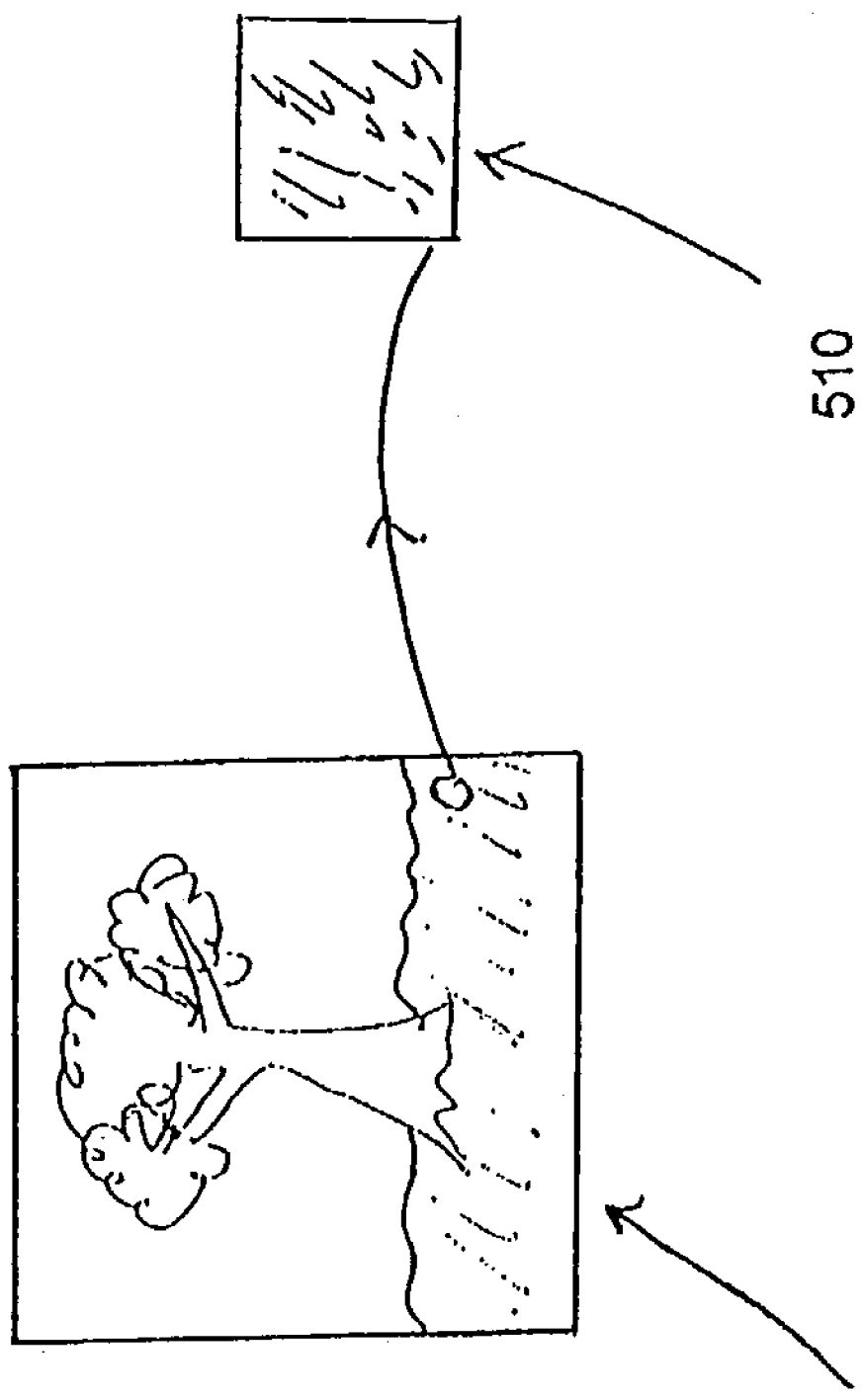
FIG. 5 illustrates an image to be acquired by the system and minute section of the image designated a pel.

FIG. 5 illustrates an image 500 to be acquired by the image processing system 400. Initially the image 500 is acquired in memory (image storage 430). The image 500 may optionally be scanned into memory. Upon acquisition, the image 500 is analyzed and quantized, that is, the entire image is broken down into a plurality of uniform minute sections called pels, which correspond to a unique portion of the image (pel 510 in FIG. 5). These unique minute sections of the image are then converted into 8 bit pels. Each pel 510 is assigned a value between 0 and 255 (8 bits). The assigned value corresponds to the darkness (grey scale) intensity of the pel 510, which corresponds to a particular portion of the original image 500, where an assigned value of zero (0) would represent the absence of any darkness (pure white)

and an assigned value of 255 represents a completely darkened region (black). All of the values between 0 and 255 correspond to various shades of grey, between pure white and black. The initial conversion process results in that the original image has been converted into an image made up of 8 bit pels at some original resolution, the resolution given by N dpi (dots per inch).

Each N dpi 8 bit pel is then halftoned to N dpi 2 bit pels. The halftoning process may be accomplished through various halftoning methods. However, the present invention is not meant to be limited to a particular halftoning method.

Figure 6:
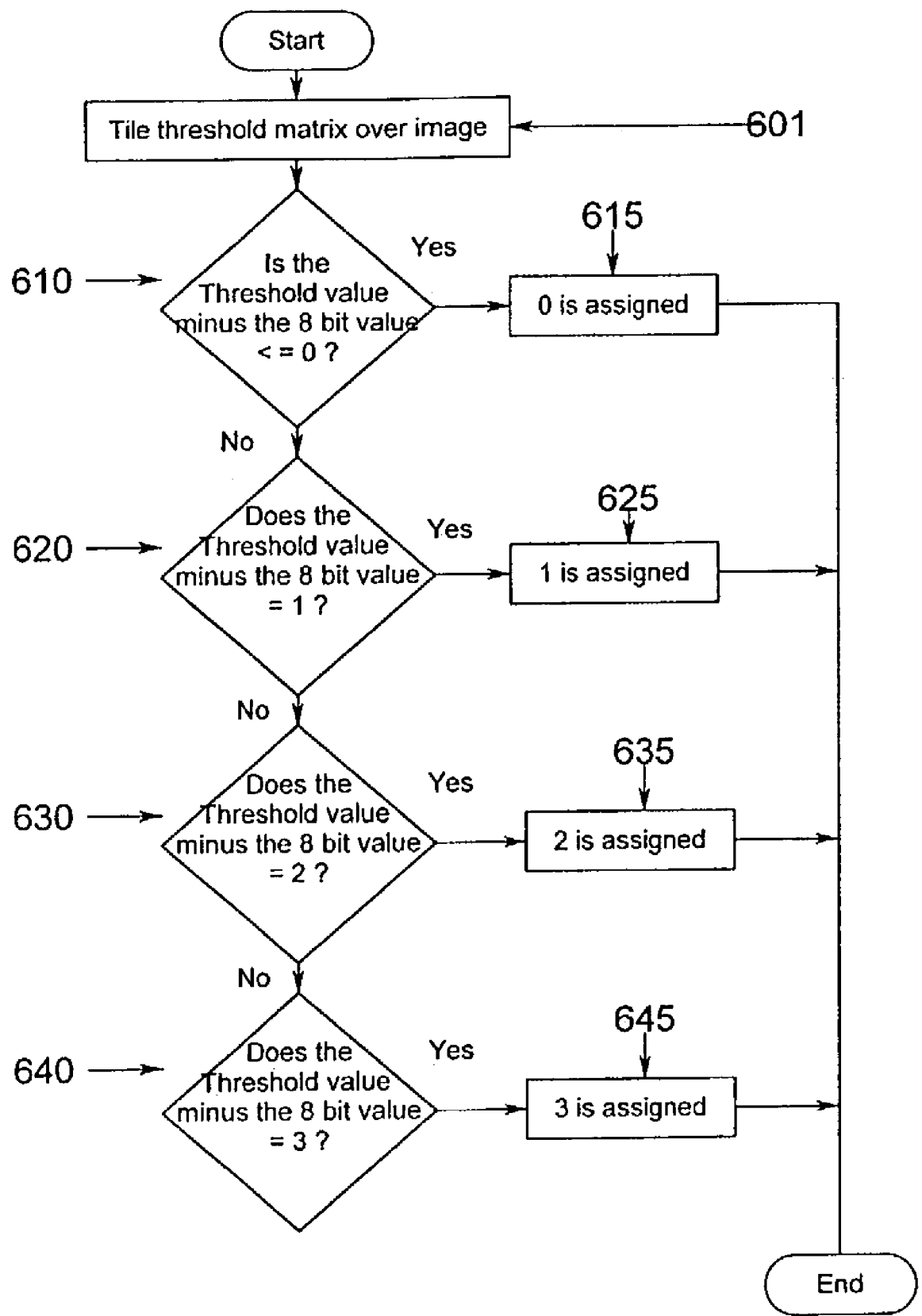
FIG. 6 illustrates a block diagram demonstrating the thresholding process which converts the 8 bit grey scale value to a 2 bit value.

FIG. 6 shows a block diagram which illustrates the thresholding process related to converting each N dpi 8 bit pel is then halftoned to N dpi 2 bit pels. A threshold matrix is tiled of the entire image, shown in block 601, that is, each assigned 8 bit grey scale value is subtracted from a defined threshold matrix value, and a 2 bit value between 0 and 3 is assigned based on the following computational device.

If the threshold value minus the assigned image value is less than or equal to zero 610, then 0 is assigned 615;

If the threshold value minus the assigned image value is equal to one 620, then 1 is assigned 625;

If the threshold value minus the assigned image value is equal to two 630, then 2 is assigned 635; and If the threshold value minus the image value is greater than or equal to three 640, then 3 is assigned 645.

Thus each N dpi 8 bit pel in the image, after halftoning through application of the threshold matrix, results in an N dpi 2 bit pel. Of course, 2 bits corresponds to values 0, 1, 2 and 3, therefore a 2 bit pel has four distinct intensity levels. However, bi-level printers are single bit device, that is the pel is either on or off (1 or 0).

The resolution of the image is then increased. By way of example, doubling the resolution (double dotting) will be fully explained, however, the resolution may be tripled (triple dotting), quadrupled (quadruple dotting), or even Y dotting, where Y is a positive integer and where the resolution of the image is increased, from N dots per inch to YN dots per inch. The intelligent dotting procedure increases the resolution of an image with increasing factors as follows: {N dpi, 2N dpi, 3N dpi, 4N dpi, â¦, YN dpi}.

Figure 7:
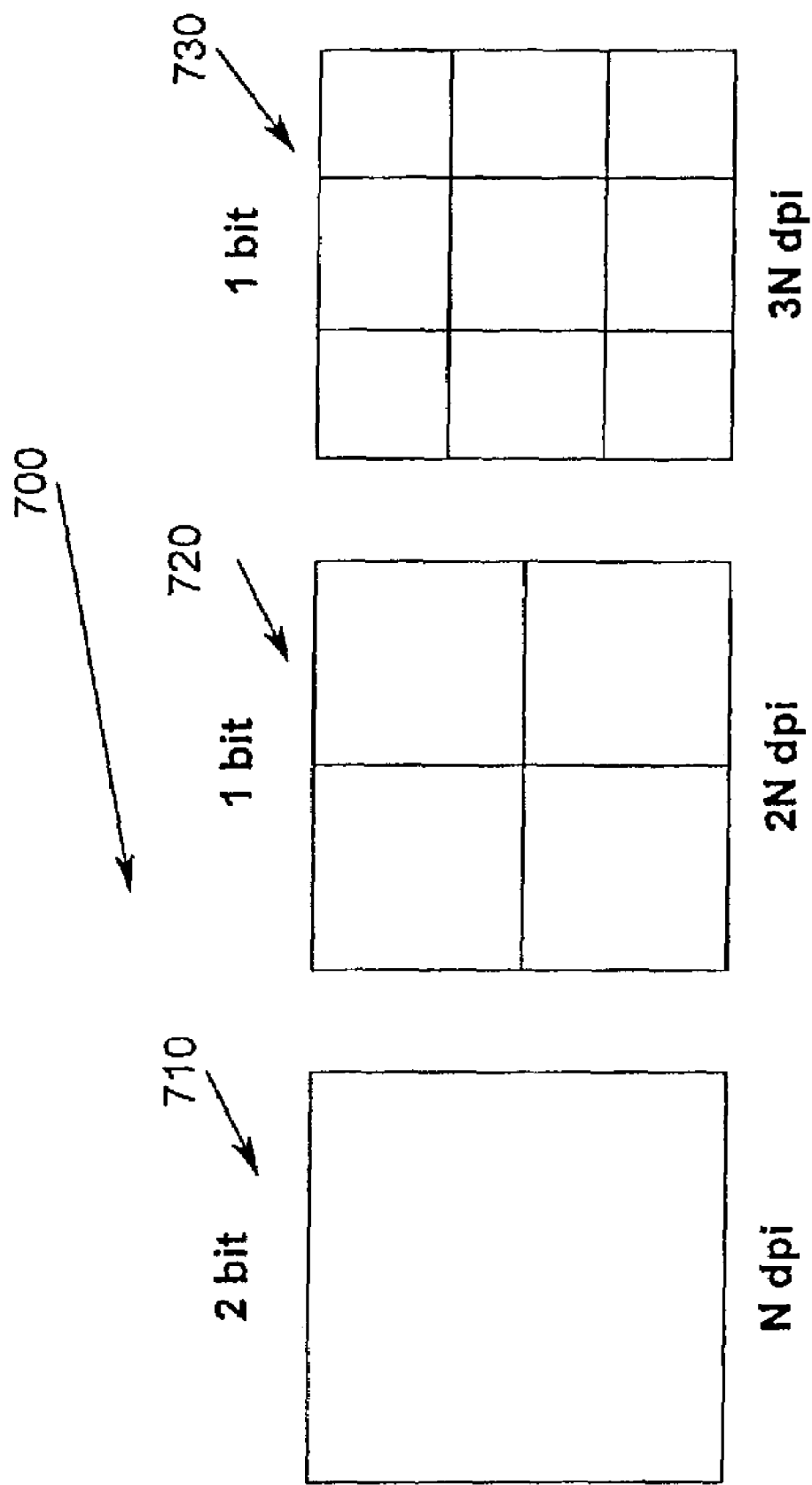
FIG. 7 illustrates a N dpi 2 bit pel converted to four 2N dpi 1 bit pels.

FIG. 7 illustrates, by way of example, the resolution multiplication process 700 for a single pel 710 using double dotting 720 and triple dotting 730. In the double dotting procedure, each of the pels in the image is double dotted in both the horizontal and vertical directions. In the double dotting procedure, each N dpi 2 bit pel 710 is converted into four 2N dpi 1 bit pels 720, wherein the resolution of the image is doubled, e.g., a single 600 dpi 2 bit pel is converted into four 1200 dpi 1 bit pels. In the triple dotting procedure, each N dpi 2 bit pel 710 is converted into nine 3N dpi 1 bit pels 730, wherein the resolution of the image is tripled, e.g., a single 600 dpi 2 bit pel is converted into 9 1800 dpi 1 bit pels. In the Yth dotting procedure (not shown), each N dpi 2 bit pel is converted into Y2 YN dpi 1 bit pels, wherein the resolution of the image is increased by a multiple of Y, e.g., a single 600 dpi 2 bit pel is converted into Y2 Y600 dpi 1 bit pels.

A 1 bit pel is either on or off (0 or 1, pure white or completely black) and thus corresponds to the capabilities of bi-level printers which are only capable of either printing a pel or not printing a pel.

Figure 8:
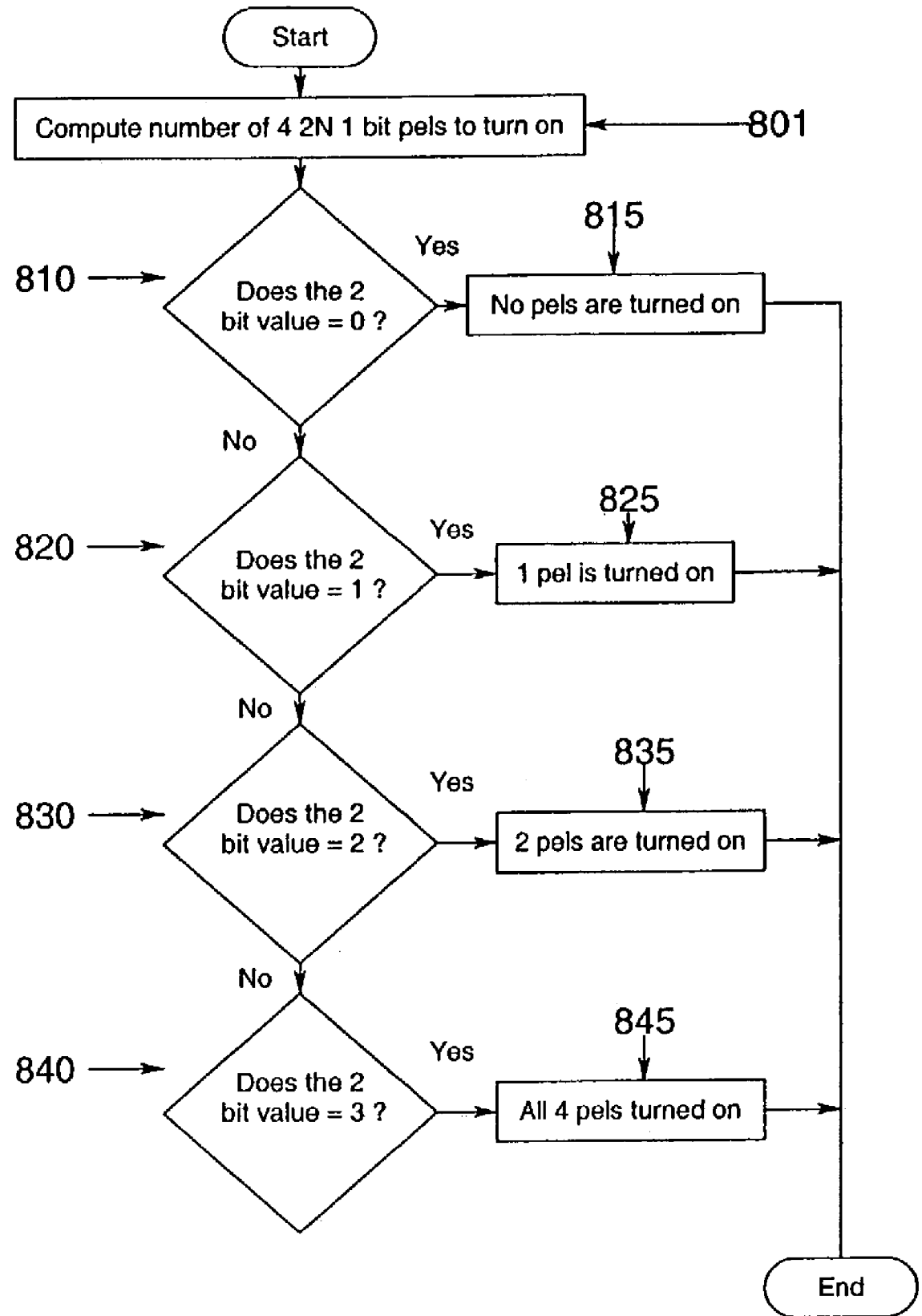

Next, returning specifically to the discussion embodied in the double dotting procedure, it must be determined, how many of the four 2N 1 bit pels are to be turned on (darkened). Another computational device 801 is introduced to decide how many of the four 2N 1 bit pels are to be turned on as illustrated in FIG. 8. Similar computational devices are used for computing increasingly higher resolution multiples, 3N resolution through YN resolution.

If the value assigned to the N dpi 2 bit pel (prior to double dotting) was 0, block 810, then none of the four 2N 1 bit pels will be turned on 815;

If the value assigned to the N dpi 2 bit pel (prior to double dotting) was 1, block 820, then 1 of the four 2N dpi 1 bit pels will be turned on 825;

If the value assigned to the N dpi 2 bit pel (prior to double dotting) was 2, block 830, then 2 of the four 2N dpi 1 bit pels will be turned on 835; and If the value assigned to the N dpi 2 bit pel (prior to double dotting) was 3, block 840, then all four 2N dpi 1 bit pels will be turned on 845.

The instance, where 3 of the four 2N dpi 1 bit pels are turned on, is not used. That is, there is no instance where only three of the four 2N dpi 1 bit pels are turned on for the following reasons. First, only four values can be represented with 2 bits (0, 1, 2 and 3). Certainly, one of the four values should correspond to the case where no pels are to be turned on (0), and another, when all four pels are to be turned on (3). This leaves only two values (1, 2) and three choices (1 pel on, 2 pels on and 3 pels on). Due to high dot gain which is associated with poor print quality, the difference in intensity between 3 pels on and 4 pels on is insignificant compared to the difference between no pels on, 1 pel on, 2 pels on and all four pels on. Therefore, the instance where only three pels will be turned on is not used.

Having now determined how many of the four 2N dpi 1 bit pels are to be turned on, it must be determined which of the particular pels are to be turned on. Clearly, no question arises from the simple instances where all four pels are turned on and where all four pels remain off. However, in the instances of a single pel turned on, or two pels turned on, it must be determined which of the four 2N dpi 1 bit pels should be turned on. This determination is accomplished through analysis of the neighborhood or surrounding pels.

Figure 9:
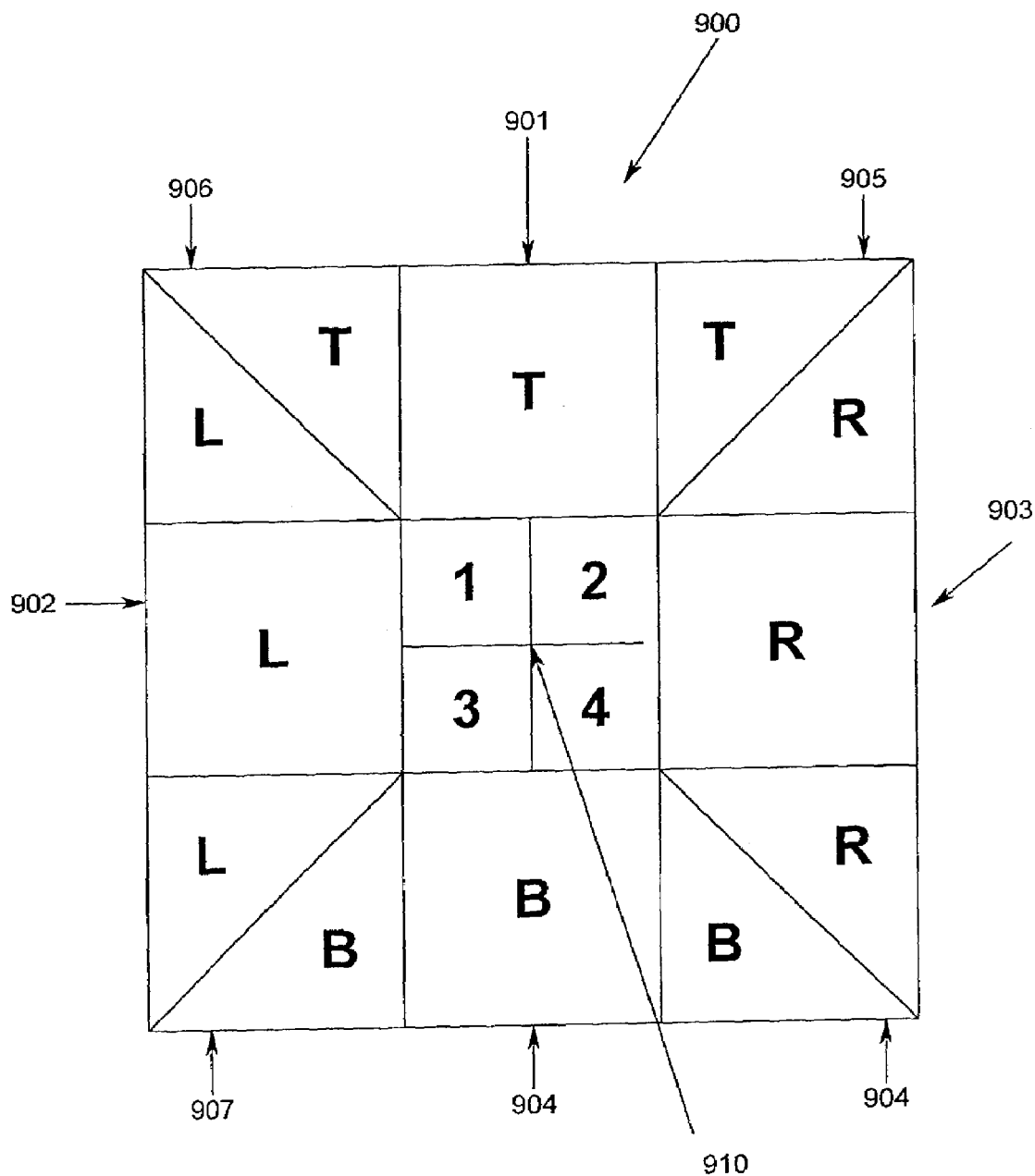
FIG. 9 illustrates a 3×3 mask used for determining which of the four 2N dpi 1 bit pels are to be turned on based on the surrounding pels in the neighborhood.

FIG. 9 illustrates the method of determining which of the four 2N dpi 1 bit pels are to be turned on in the double dotting enhancement method. The position of the pels to be turned on is determined by scanning a 3×3 mask 900 over the N dpi 2 bit-per-pel image, and using the neighborhood (surrounding pels) to determine the position of the double dotted 2N dpi 1 bit pels representing the center N dpi 2 bit pel.

The 3×3 mask 900 corresponds to the eight adjacent pels surrounding the pel in question, the center pel 910 made up of the four 2N dpi 1 bit pels. The eight adjacent pels correspond to the pel directly above (on top of) the pel in question (top T) 901, the pel directly to the left (left L) 902, the pel directly to the right (right R) 903, the pel directly below (on bottom of) the pel in question (bottom B) 904, the pel being diagonally adjacent at the top right corner of the pel in question (top right T/R) 905, the pel diagonally adjacent to the top left corner of the pel in question (top left T/L) 906, the pel diagonally adjacent to the bottom left corner of the pel in question (left bottom L/B) 907, and the pel diagonally adjacent the bottom right corner of the pel in question (bottom right B/R) 908.

Each of the surrounding pels (901-908) in the neighborhood of the pel in question (the center pel 910) have a value assigned thereto. Values are computed for top, bottom, right and left justifications. The values of the surrounding pels are used to determine a score (value) for each of the four justifications. The score (value) for right justification, for example, is computed by adding half the values of the pels that are diagonal right from the center, both top right 905 and bottom right 908, to the value of the pel to the right of center 903. Each of the diagonal pels is split between two values corresponding to adjacent pels, for example, the pel diagonally adjacent at the top right corner of the pel in question (top right T/R) 905 is split between two values, one which corresponds to top justification, and one which corresponds to right justification.

The above described 3×3 mask is also clearly applicable to the higher order resolution increases, i.e., 3N dotting through YN dotting, since the effect of any higher order dotting procedure still results in an originally sized pel being divided into smaller and smaller higher resolution sections and being surrounded by eight adjacent neighborhood pels.

Figure 10:
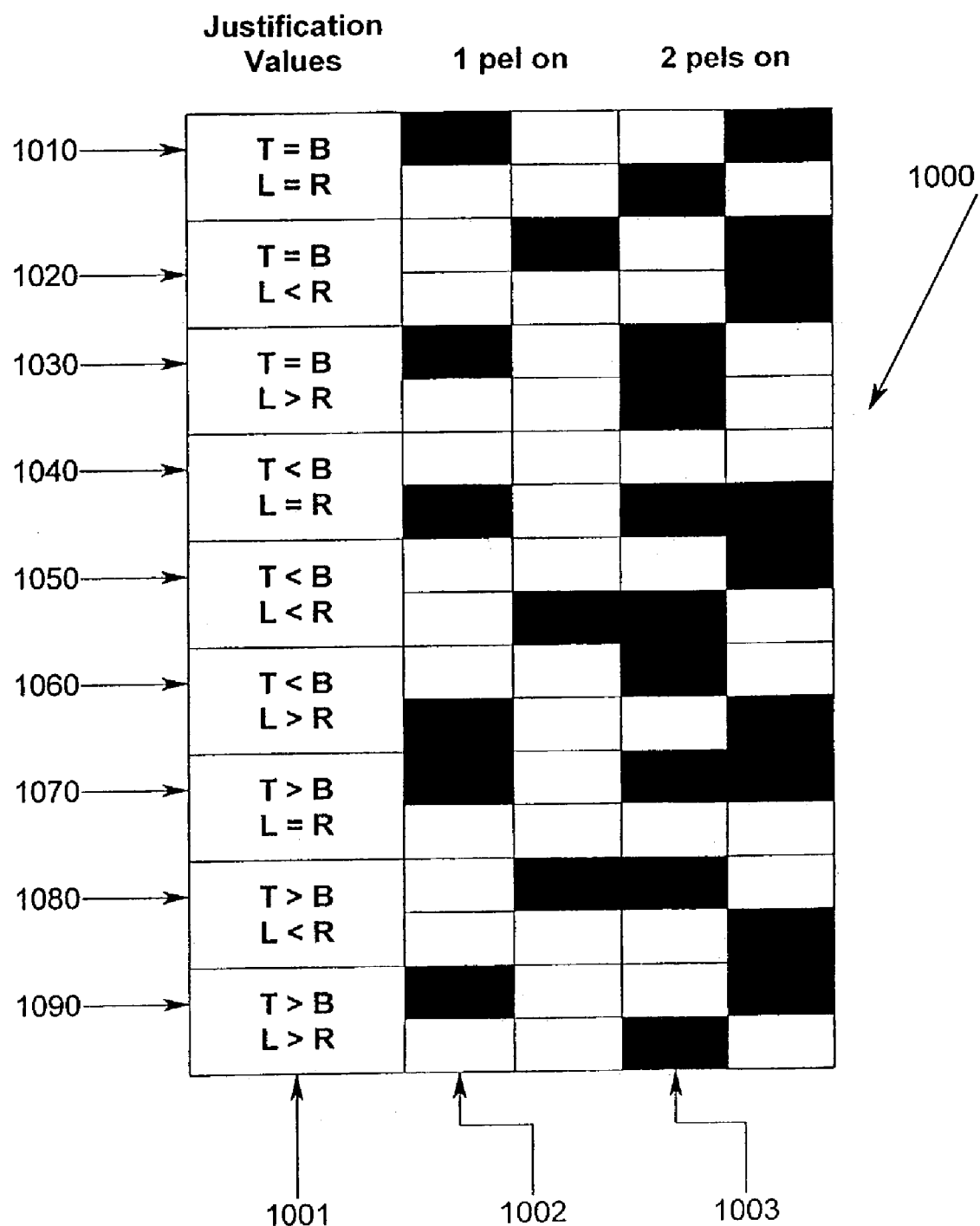
FIG. 10 illustrates a table demonstrating which particular pels are to be turned on for the case of a single pel being turned on and two pels being turned on for all possible justification values.

FIG. 10 illustrates a table which demonstrates, specifically for the double dotting procedure, which pel is to be turned on for both the case of a single pel of the four 2N dpi 1 bit pels being turned on and for the case of two pels of the four 2N 1 bit pels being turned on for all possible justification values. The position of the 2N dpi 1 bit pel or pels that are to be turned on determines the pel or pels which represent the center N dpi 2 bit pel.

As shown in FIG. 10, the first column 1001 shows all the various combinations of justification values for the four distinct justifications; top (T), left (L), right (R) and bottom (B). The second column 1002 shows which pel is to be turned on for every particular combination of justification values for the case where a single pel is to be turned on. The third column 1003 shows which two pels are to be turned on for the case where two pels are to be turned on for every particular combination of justification values.

In the first row 1010 the default orientations for the instances of 1 pel turned on and two pels turned on are shown. The top left pel of the four 2N 1 bit pels is turned on in the default orientation for a single pel. The default orientation is defined as when the values for all four justifications are equal, that is, the top justification is equal to the bottom justification (T=B) and the left justification is equal to the right justification (L=R). When the top justification is greater than or equal to the bottom justification (T=>B), the top justification dominates. Likewise, when the left justification is greater than or equal to the right justification (L=R), the left justification dominates.

Therefore, for the instance of a single being turned on, as shown in FIG. 10, when T=B and L=R, the top left pel is turned on (column 1002, row 1010), when T=B and L<R, the top right pel is turned on (column 1002, row 1020), when T=B and L>R, the top left pel is turned on (column 1002, row 1030), when T<B and L=R, the bottom left pel is turned on (column 1002, row 1040), when T<B and L<R, the bottom right pel is turned on (column 1002, row 1050), when T<B and L>R, the bottom left pel is turned on (column 1002, row 1060), when T>B and L=R, the top left pel is turned on (column 1002, row 1070), when T>B and L<R, the top right pel is turned on (column 1002, row 1080), and when T>B and L>R, the top left pel is turned on (column 1002, row 1090).

The pel to be turned on in the single pel instance is intuitive once the default situation is known. The situation where 2 pels are to be turned on is not as intuitive. When the two pels are in diagonal orientation, the direction is such that it is more likely to produce a white pel surrounded by black pels than a black pel surrounded by white pels. A single white pel is likely to be filled in by dot gain and go unnoticed, however a single black pel sticking out from a cluster adds noise to the image and degrades the quality.

Therefore, for the instance where two pels are to be turned on, as shown in the FIG. 10, when T=B and L=R, the top right pel and the bottom left pel are turned on (column 1003, row 1010), when T=B and L<R, the top right pel and the bottom right pel are turned on (column 1003, row 1020), when T=B and L>R, the top left pel and the bottom left pel are turned on (column 1003, row 1030), when T<B and L=R, the bottom left pel and the bottom right pel are turned on (column 1003, row 1040), when T<B and L<R, the top right pel and bottom left pel are turned on (column 1003, row 1050), when T<B and L>R, the top left pel and the bottom right pel are turned on (column 1003, row 1060), when T>B and L=R, the top left pel the top right pel are turned on (column 1003, row 1070), when T>B and L<R, the top left pel and the bottom right pel are turned on (column 1003, row 1080), and when T>B and L>R, the top right pel and the bottom left are turned on (column 1003, row 1090).

After each of the pels have been converted, double dotted, and then the determination of how many and which pels are to be turned on, the processed image is now ready to be printed. The instructions containing the converted pel information of the image are then sent via output 442 of the image processor 440 a bi-level printer 450.

Figure 11:
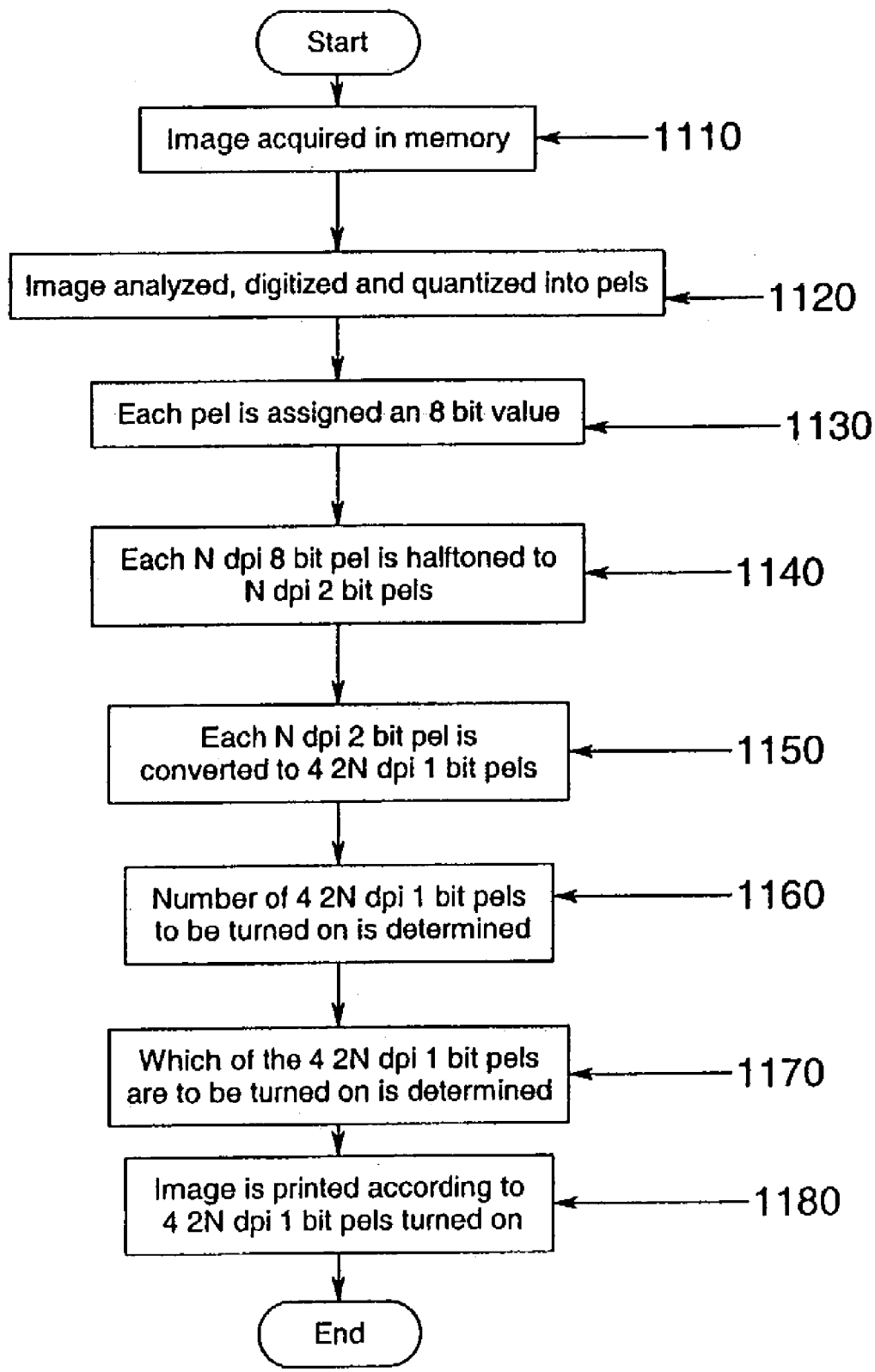
FIG. 11 illustrates a block diagram demonstrating the method of enhancing the resolution of an image according to the present invention.

FIG. 11 illustrates the method for enhancing the resolution of an image according to the double dotting embodiment of the present invention. First, the image is acquired into memory as shown in block 1110. Once acquired in memory the image is analyzed, digitized and quantized into individual pels as shown in block 1120. Each pel is then assigned an 8 bit value based upon the analyzed grey scale value of the image at that particular pel location as shown in block 1130. The image processor then converts each N dpi 8 bit pel value to a N dpi 2 bit pel value through a thresholding halftoning process as shown in block 1140.

Each N dpi 2 bit pel is then converted to 4 2N dpi 1 bit pels through the double dotting process as shown in block 1150. The image processor then determines the number of the 4 2N dpi 1 bit pels to be turned on based upon the N dpi 2 bit pel value as shown in block 1160. The image processor then determines which of the four 2N dpi 1 bit pels are to be turned on by analysis of the surrounding pels through the application of a 3×3 mask which produces top, left, right and bottom justification values which are used in making the determination as shown in block 1170.

Finally, the analysis and conversion being completed, the image is printed according to the 4 2N dpi 1 bit pel information, the number and position of the pels to be turned on which comprise the entire image, the information being sent to a print controller as shown in block 1180.

The net effect of the intelligent double dotting is that black pels are clustered, and the image is sharpened compared to an image using traditional halftoning alone. Overall image quality is improved, especially for printers with high dot gain and/or single pels that don't print reliably. Although only the particular embodiment of image enhancement through resolution doubling procedures has been fully described, the enhancement procedure can be applied to increasingly higher order resolution multiplication through the methods and system environments described herein.

Although the invention was described in terms of black and white images, the invention can of course be implemented with color images. Color printers use different halftoning methods, typically a different halftone screen for each color plane. In this instance, the double dotting procedure and higher order resolution enhancement can be applied to each color plane separately.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description but rather by the claims appended hereto.

What is claimed is:

1. A method for simulating 2 bit pel printing on a bi-level printer, comprising:
   converting an image to an N dpi 8 bit-per-pel image;
   halftoning the N dpi 8 bit-per-pel image to an N dpi 2 bit-per-pel image; and
   increasing a resolution of the N dpi 2 bit-per-pel image by a predetermined multiple, Y, by converting each N dpi 2 bit pel from the N dpi 2 bit-per-pel image to $Y^2$ YN dpi 1-bit pels to produce a 1-bit pel image, wherein Y is a resolution enhancement multiplier and YN is a number of individual dots per inch in the 1-bit pel image.

2. The method according to claim 1 wherein the converting N dpi 2 bit pels from the N dpi 2 bit-per-pel image to YN dpi 1-bit pels comprises determining a number of YN 1 bit pels out of the $Y^2$ YN dpi 1-bit pels to turn on based upon a 2 bit pel value of the N dpi 2 bit pels.

3. The method of claim 2 wherein a position of the number of YN dpi 1 bit pels out of the $Y^2$ YN dpi 1-bit pels turned on is determined by scanning a 3×3 mask over the N dpi 2 bit-per-pel image and using neighborhood information to select the position of the number of YN dpi 1-bit pels representing a center N dpi 2 bit pel.

4. The method of claim 3 wherein the using neighborhood information to select the position of the number of YN dpi 1-bit pels representing the center N dpi 2 bit pel comprises computing a value for a position comprising top, bottom, right and left justification values.

5. The method of claim 4 wherein the value for a position comprising top, bottom, right and left justification values is computed by adding half a value of a justification value of pels that are diagonal to a justified position to a value of a pel directly adjacent the center N dpi 2 bit pel.

6. The method of claim 5 wherein pels are justified according to a predetermined default justification orientation.

7. A method for simulating 2 bit pel printing on a bi-level printer, comprising:
   converting an image to an N dpi 8 bit-per-pel image;
   halftoning the N dpi 8 bit-per-pel image to an N dpi 2 bit-per-pel image; and
   increasing a resolution of the N dpi 2 bit-per-pel image by a predetermined multiple, 2, by converting each N dpi 2 bit pel from the N dpi 2 bit-per-pel image to 4 2N dpi 1-bit pels to produce a 1-bit pel image, wherein 2 is a resolution enhancement multiplier and 2N is a number of individual dots per inch in the 1-bit pel image.

8. The method according to claim 7 wherein the converting N dpi 2 bit pels from the N dpi 2 bit-per-pel image to 4 2N dpi 1-bit pels comprises determining a number of 2N dpi 1 bit pels out of the 4 2N dpi 1-bit pels to turn on based upon a 2 bit pel value of the N dpi 2 bit pels.

9. The method of claim 8 wherein a position of the number of 2N dpi 1 bit pels out of the 4 2N dpi 1-bit pels turned on is determined by scanning a 3×3 mask over the N dpi 2 bit-per-pel image and using neighborhood information to select the position of the number of 4 2N dpi 1-bit pels representing a center N dpi 2 bit pel.

10. The method of claim 9 wherein the using neighborhood information to select the position of the number of 4 2N dpi 1-bit pels representing the center N dpi 2 bit pel comprises computing a value for a position comprising top, bottom, right and left justification values.

11. The method of claim 10 wherein the value for a position comprising top, bottom, right and left justification values is computed by adding half a value of a justification value of pels that are diagonal to a justified position to a value of a pel directly adjacent the center N dpi 2 bit pel.

12. The method of claim 11 wherein pels are justified according to a predetermined default justification orientation.

13. An apparatus for enhancing the resolution of an image to be printed using a bi-level printer simulating 2 bit pel printing comprising:
   a memory for storing an image; and
   an image processor, wherein the image processor converts the image to an N dpi 8 bit-per-pel image, halftones the N dpi 8 bit-per-pel image to an N dpi 2 bit-per-pel image and increases a resolution of the N dpi 2 bit-per-pel image by a predetermined multiple, 2, by converting each N dpi 2 bit pel from the N dpi 2 bit-per-pel image to 4 2N dpi 1-bit pels to produce a 1-bit pel image, wherein 2 is a resolution enhancement multiplier and 2N is a number of individual dots per inch in the 1-bit pel image.

14. The apparatus according to claim 13 wherein the image processor converts the N dpi 2 bit pels from the N dpi 2 bit-per-pel image to 4 2N dpi 1-bit pels and determines a number of 2N dpi 1 bit pels out of the 4 2N dpi 1-bit pels to turn on based upon a 2 bit pel value of the N dpi 2 bit pels.

15. The apparatus of claim 14 wherein a position of the number of 2N 1 bit pels out of the 4 2N dpi 1-bit pels turned on is determined by the image processor by scanning a 3×3 mask over the N dpi 2 bit-per-pel image and using neighborhood information to select the position of the number of 4 2N dpi 1-bit pels representing a center N dpi 2 bit pel.

16. The apparatus of claim 15 wherein the image processor uses neighborhood information to select the position of the number of 4 2N dpi 1-bit pels representing a center N dpi 2 bit pel and computes a value for a position with top, bottom, right and left justification values.

17. The apparatus of claim 16 wherein the value for the position computed with top, bottom, right and left justification values is computed by the image processor by adding half a justification value of pels that are diagonal to a justified position to a value of a pel directly adjacent the center N dpi 2 bit pel.

18. The apparatus of claim 17 wherein pels are justified according to a predetermined default justification orientation contained in the image processor.

19. An article of manufacture comprising a program storage medium readable by a computer, the medium tangibly embodying one or more programs of instructions executable by the computer to perform a method for simulating 2 bit pel printing on a bi-level printer, the method comprising:
   converting an image to an N dpi 8 bit-per-pel image;
   halftoning the N dpi 8 bit-per-pel image to an N dpi 2 bit-per-pel image; and
   increasing a resolution of the N dpi 2 bit-per-pel image by a predetermined multiple, 2, by converting each N dpi 2 bit pel pets from the N dpi 2 bit-per-pel image to 4 2N dpi 1-bit pels to produce a 1-bit pel image, wherein 2 is a resolution enhancement multiplier and 2N is a number of individual dots per inch in the 1-bit pel image.

20. The article of manufacture according to claim 19, wherein the converting N dpi 2 bit pels from the N dpi 2 bit-per-pel image to 4 2N dpi 1-bit pels comprises determining a number of 2N 1 bit pels out of the 4 2N dpi 1-bit pels to turn on based upon a 2 bit pel value of the N dpi 2 bit pels.

21. The article of manufacture of claim 20 wherein a position of the number of 2N dpi 1 bit pels out of the 4 2N dpi 1-bit pels turned on is determined by scanning a 3×3 mask over the N dpi 2 bit-per-pel image and using neighborhood information to select the position of the number of 4 2N dpi 1-bit pels representing a center N dpi 2 bit pel.

22. The article of manufacture of claim 21 wherein the using neighborhood information to select the position of the number of 4 2N dpi 1-bit pels representing the center N dpi 2 bit pel comprises computing a value for the position comprising top, bottom, right and left justification values.

23. The article of manufacture of claim 22 wherein the value for the position comprising top, bottom, right and left justification values is computed by adding half a value of a justification value of pels that are diagonal to a justified position to a value of a pel directly adjacent the center N dpi 2 bit pel.

24. The article of manufacture of claim 23 wherein pels are justified according to a predetermined default justification orientation.

25. A printer system, comprising:
a scanner for scanning an input image;
a memory, coupled to the scanner, the memory storing a scanned image; and
an image processor, coupled to the memory, for processing the scanned image in the memory, wherein the image processor converts the image to an N dpi 8 bit-per-pel image, halftones the N dpi 8 bit-per-pel image to an N dpi 2 bit-per-pel image and increases a resolution of the N dpi 2 bit-per-pel image by a predetermined multiple, 2, by converting each N dpi 2 bit pel from the N dpi 2 bit-per-pel image to 4 2N dpi 1-bit pels to produce a 1-bit pel image, wherein 2 is a resolution enhancement multiplier and 2N is a number of individual dots per inch in the 1-bit pel image.

26. The printer system according to claim 25 wherein the image processor converts N dpi 2 bit pels from the N dpi 2 bit-per-pel image to 4 2N dpi 1-bit pels via determining a number of 2N 1 bit pels out of the 4 2N dpi 1-bit pels to turn on based upon a 2 bit pel value of the N dpi 2 bit pels.

27. The printer system of claim 26 wherein a position of the number of 2N dpi 1 bit pels out of the 4 2N dpi 1-bit pels turned on is determined by scanning a 3×3 mask over the N dpi 2 bit-per-pel image and using neighborhood information to select the position of the number of 4 2N dpi 1-bit pels representing a center N dpi 2 bit pel.

28. The printer system of claim 27 wherein the using neighborhood information to select the position of the number of 4 2N dpi 1-bit pels representing the center N dpi 2 bit pel comprises computing a value for the position comprising top, bottom, right and left justification values.

29. The printer system of claim 28 wherein the value for the position comprising top, bottom, right and left justification values is computed by adding half a value of a justification value of pels that are diagonal to a justified position to a value of a pel directly adjacent the center N dpi 2 bit pel.

30. An image enhancing system, comprising:
means for scanning an input image;
means for storing a scanned image coupled to the means for scanning, and means for processing a stored image coupled to the means for storing, wherein the means for processing converts the stored image to an N dpi 8 bit-per-pel image, halftones the N dpi 8 bit-per-pel image to an N dpi 2 bit-per-pel image and increases a resolution of the N dpi 2 bit-per-pel image by a predetermined multiple, 2, by converting each N dpi 2 bit pel from the N dpi 2 bit-per-pel image to 4 2N dpi 1-bit per-pels wherein 2 is a resolution enhancement multiplier and 2N is a number of individual dots per inch in the 1-bit pel image.

31. The printer system of claim 30 wherein pels are justified according to a predetermined default justification orientation.

32. The image enhancing system according to claim 31 wherein the means for processing converts N dpi 2 bit pels from the N dpi 2 bit-per-pel image to 4 2N dpi 1-bit pels via determining a number of 2N dpi 1 bit pels out of the 4 2N dpi 1-bit pels to turn on based upon a 2 bit pel value of the N dpi 2 bit pels.

33. The image enhancing system of claim 32 wherein a position of the number of 2N dpi 1 bit pels out of the 4 2N dpi 1-bit pels turned on is determined by scanning a 3×3 mask over the N dpi 2 bit-per-pel image and using neighborhood information to select the position of the number of 4 2N dpi 1-bit pels representing a center N dpi 2 bit pel.

34. The image enhancing system of claim 33 wherein the using neighborhood information to select the position of the number of 4 2N dpi 1-bit pels representing the center N dpi 2 bit pel comprises computing a value for the position comprising top, bottom, right and left justification values.

35. The image enhancing system of claim 34 wherein the value for the position comprising top, bottom, right and left justification values is computed by adding half a value of a justification value of pels that are diagonal to a justified position to a value of a pel directly adjacent the center N dpi 2 bit pel.

36. The image enhancing system of claim 35 wherein pels are justified according to a predetermined default justification orientation.

* * * * *